(12) United States Patent
Ishiguro et al.

(10) Patent No.: US 10,241,251 B2
(45) Date of Patent: Mar. 26, 2019

(54) POLARIZING PLATE AND IMAGE DISPLAY DEVICE

(71) Applicant: FUJIFILM Corporation, Tokyo (JP)

(72) Inventors: Makoto Ishiguro, Kanagawa (JP); Yoshiaki Hisakado, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 189 days.

(21) Appl. No.: 15/215,865

(22) Filed: Jul. 21, 2016

(65) Prior Publication Data

US 2016/0327711 A1    Nov. 10, 2016

Related U.S. Application Data

(63) Continuation of application No. PCT/JP2015/051258, filed on Jan. 19, 2015.

(30) Foreign Application Priority Data

Jan. 23, 2014 (JP) .................................. 2014-010833
Apr. 16, 2014 (JP) .................................. 2014-084667

(51) Int. Cl.
*G02B 5/30* (2006.01)
*C08F 222/10* (2006.01)
(Continued)

(52) U.S. Cl.
CPC ............ *G02B 5/305* (2013.01); *C08F 222/10* (2013.01); *C09J 133/06* (2013.01); *G02B 5/3025* (2013.01);
(Continued)

(58) Field of Classification Search
CPC ........... G02F 2202/28; G02F 1/133528; G02B 5/305; G02B 5/3025; G02B 1/14;
(Continued)

(56) References Cited

U.S. PATENT DOCUMENTS

2006/0108050 A1* 5/2006 Satake ...................... B32B 3/02
156/101
2009/0004485 A1* 1/2009 Zheng ................... C07C 255/09
428/446

(Continued)

FOREIGN PATENT DOCUMENTS

JP          2006-193632 A      7/2006
JP          2008-129428 A      6/2008
(Continued)

OTHER PUBLICATIONS

Notification of Reasons for Refusal issued by the Japanese Patent Office dated May 9, 2017, in connection with Japanese Patent Application No. 2015-558842.
(Continued)

*Primary Examiner* — William R Alexander
(74) *Attorney, Agent, or Firm* — Edwards Neils, LLC; Jean C. Edwards, Esq.

(57) ABSTRACT

The present invention is to provide a polarizing plate exhibiting sufficient adhesiveness between a resin layer and a pressure sensitive adhesive layer and excellent peeling property in reworking process, and an image display device provided with the polarizing plate. The polarizing plate of the present invention includes a polarizer, and the resin layer that is in direct contact with the polarizer, in which the thickness of the polarizer is 20 μm or less, a hydrogen bonding component of a surface free energy of the resin layer is 3.5 mN/m or more, and the thickness of the polarizing plate is 70 μm or less.

17 Claims, 1 Drawing Sheet

(51) Int. Cl.
C09J 133/06 (2006.01)
G02F 1/1335 (2006.01)
G02B 1/14 (2015.01)

(52) U.S. Cl.
CPC ..... *G02F 1/133528* (2013.01); *C09J 2433/00* (2013.01); *G02B 1/14* (2015.01); *G02F 2202/28* (2013.01)

(58) Field of Classification Search
CPC ...... C08F 222/10; C09J 133/06; C09J 133/00; C09J 2433/00
USPC .................................... 359/483.01
See application file for complete search history.

(56) References Cited

U.S. PATENT DOCUMENTS

| 2009/0237601 | A1* | 9/2009 | Shutou | G02B 5/3083 349/118 |
| 2010/0039590 | A1* | 2/2010 | Miyatake | C09J 129/04 349/96 |
| 2010/0231831 | A1* | 9/2010 | Miyatake | G02F 1/13363 349/96 |
| 2011/0043733 | A1* | 2/2011 | Suzuki | C09J 135/04 349/96 |
| 2011/0149211 | A1* | 6/2011 | Ha | C09J 7/0207 349/96 |
| 2011/0273646 | A1* | 11/2011 | Fukagawa | C08J 5/18 349/96 |
| 2012/0320318 | A1 | 12/2012 | Sato et al. | |
| 2015/0378073 | A1* | 12/2015 | Ohno | G02B 5/305 359/492.01 |
| 2016/0187553 | A1 | 6/2016 | Sato et al. | |
| 2016/0223719 | A1* | 8/2016 | Ishiguro | B32B 7/02 |

FOREIGN PATENT DOCUMENTS

| JP | 2011-221185 A | 11/2011 |
| JP | 2013-205545 A | 10/2013 |
| JP | 2013-238640 A | 11/2013 |
| JP | 2014-010207 A | 1/2014 |
| WO | 2011/108350 A1 | 9/2011 |
| WO | 2013/161647 A1 | 10/2013 |

OTHER PUBLICATIONS

International Search Report issued in PCT/JP2015/051258 dated Mar. 10, 2015.
International Preliminary Report on Patentability issued by WIPO dated Aug. 4, 2016, in connection with International Patent Application No. PCT/JP2015/051258.

* cited by examiner

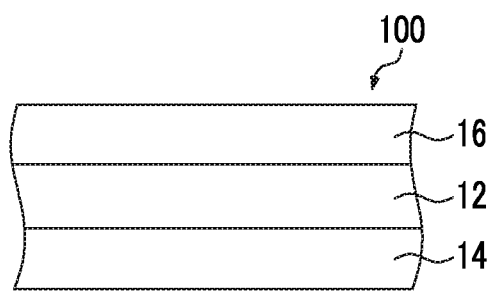

POLARIZING PLATE AND IMAGE DISPLAY DEVICE

CROSS-REFERENCE TO RELATED APPLICATIONS

This application is a Continuation of PCT International Application No. PCT/JP2015/051258 filed on Jan. 19, 2015, which was published under PCT Article 21(2) in Japanese, and which claims priority under 35 U.S.C. § 119(a) to Japanese Patent Application No. 2014-010833 filed on Jan. 23, 2014, and Japanese Patent Application No. 2014-084667 filed on Apr. 16, 2014. The above applications are hereby expressly incorporated by reference, in their entirety, into the present application.

BACKGROUND OF THE INVENTION

1. Field of the Invention

The present invention relates to a polarizing plate comprising a polarizer and a resin layer that is in direct contact with the polarizer, and an image display device.

2. Description of the Related Art

Typically, since a polarizer is inferior in mechanical strength, a polarizer is used in the form of a polarizing plate formed by laminating a polarizer protective film such as a film made of saponified triacetyl cellulose on the polarizer.

On the other hand, in recent years, there has been a demand for various performance improvements such as improvement in mechanical strength have been demanded for a polarizer protective film and various proposals have been made.

For example, in JP2011-221185A, there is disclosed a polarizing plate obtained by forming a cured resin layer formed from a curable resin composition including a polyfunctional (meth)acrylic monomer directly on a surface of a polarizer ("claim 1"), and the adhesiveness between the polarizer and the cured resin layer is excellent ("0008").

SUMMARY OF THE INVENTION

With the expansion in applications of image display devices such as liquid crystal display devices and organic EL display devices, there has been a demand for a thinner polarizer.

The present inventors have conducted an investigation on the peelability (hereinafter, also referred to as "peeling property in reworking process") of the polarizing plate in an image display device using the polarizing plate described in JP2011-221185A and found that due to insufficient adhesiveness between the cured resin layer and the pressure sensitive adhesive layer, in a case in which the polarizing plate is peeled off, a pressure sensitive adhesive remains on the panel (display device) side of the image display device, which causes a problem of a so-called pressure sensitive adhesive residue, thereby deteriorating the peeling property in reworking process.

An object of the present invention is to provide a polarizing plate comprising a resin layer directly formed on a polarizer and exhibiting sufficient adhesiveness between the resin layer and a pressure sensitive adhesive layer and excellent peeling property in reworking process, and an image display device provided with the polarizing plate.

As a result of intensive investigations to solve the above problems, the present inventors have found that by using a polarizing plate using a resin layer having a hydrogen bonding component of a surface free energy in a predetermined range as a resin layer to be formed directly on a polarizer, sufficient adhesiveness is exhibited between a resin layer and a pressure sensitive adhesive layer and excellent peeling property in reworking process is obtained. Thus, the present invention has been completed.

That is, the present inventors have found the above problems can be solved by adopting the following constitutions.

[1] A polarizing plate comprising: a polarizer; and a resin layer that is in direct contact with the polarizer, in which the thickness of the polarizer is 20 μm or less, a hydrogen bonding component of a surface free energy of the resin layer is 3.5 mN/m or more, and the thickness of the polarizing plate is 70 μm or less.

[2] The polarizing plate according to [1], further comprising: a pressure sensitive adhesive layer on the resin layer.

[3] The polarizing plate according to [2], in which the pressure sensitive adhesive layer includes an acrylic adhesive including an acrylic polymer.

[4] The polarizing plate according to [2] or [3], in which the pressure sensitive adhesive layer includes a component having an isocyanate group.

[5] The polarizing plate according to any one of [1] to [4], in which Re(550) and Rth(550) of the resin layer satisfy the following expressions (X) and (Y), respectively:

$$Re(550) \leq 10 \text{ nm} \quad \text{Expression (X)}$$

$$|Rth(550)| \leq 10 \text{ nm} \quad \text{Expression (Y)}$$

(wherein Re(550) represents an in-plane retardation (nm) at a wavelength of 550 nm and Rth(550) represents a retardation (nm) in a thickness direction at a wavelength of 550 nm).

[6] The polarizing plate according to any one of [1] to [5], in which the resin layer is a layer obtained by polymerizing and curing a polyfunctional monomer, and a polymerizable group included in the polyfunctional monomer is a (meth)acryloyl group.

[7] The polarizing plate according to any one of [1] to [6], in which the resin layer is a layer obtained by polymerizing and curing a boronic acid monomer having a boronic acid group and a polymerizable group represented by the following Formula (1), and a polyfunctional monomer:

Formula (1)

(wherein, in Formula (1), $R^1$ and $R^2$ each independently represent a hydrogen atom, or a substituted or unsubstituted aliphatic hydrocarbon group, aryl group or heterocyclic group, $R^1$ and $R^2$ may be linked to each other to form a ring, and * indicates a bonding position).

[8] An image display device comprising:
the polarizing plate according to any one of [1] to [7].

[9] The image display device according to [8] that is a liquid crystal display device.

According to the present invention, it is possible to provide a polarizing plate comprising a resin layer formed directly on a polarizer and exhibiting sufficient adhesiveness between the resin layer and a pressure sensitive adhesive layer and excellent peeling property in reworking process, and an image display device provided with the polarizing plate.

BRIEF DESCRIPTION OF THE DRAWINGS

FIG. 1 is a cross-sectional view schematically showing an embodiment of a polarizing plate of the present invention.

DESCRIPTION OF THE PREFERRED EMBODIMENTS

Hereinafter, the present invention will be described in detail.

The description of the constitution requirements to be described below is occasionally made on the basis of representative embodiments of the present invention, but the present invention is not limited these embodiments.

The numerical range represented by the term "to" in the specification includes the numerical values set forth before and after "to" as lower and upper limits, respectively.

In addition, the term "(meth)acryloyl group" is a concept including both an acryloyl group and a methacryloyl group and similarly, the term "(meth)acrylate" is a concept including both acrylate and methacrylate.

[Polarizing Plate]

A polarizing plate of the present invention is a polarizing plate comprising a polarizer, and a resin layer that is in direct contact with one surface or both surfaces of the polarizer in which the thickness of the polarizer is 20 µm or less, a hydrogen bonding component of surface free energy of the resin layer is 3.5 mN/m or more, and the thickness of the polarizing plate is 70 µm or less.

In the present invention, by providing such a resin layer directly on the polarizer, sufficient adhesiveness is exhibited between the resin layer and a pressure sensitive adhesive layer and peeling property in reworking process is satisfactory.

This is because, although details are not clear, the present inventors are presumed as follows.

First, from the viewpoint of adhesiveness with a glass substrate constituting a display device, there is a tendency of using a pressure sensitive adhesive layer that generally has excellent reactivity with a hydroxyl group which may be present in the glass substrate.

Therefore, it can be thought that the adhesiveness of the pressure sensitive adhesive layer with the glass substrate tends to become relatively stronger than with the resin layer, and as a result, in the case in which the polarizing plate is peeled off, there arises a problem of a pressure sensitive adhesive remaining in an image display device.

It can be thought that when the hydrogen bonding component of surface free energy of the resin layer is set to 3.5 mN/m or more as in the present invention, the adhesiveness of the pressure sensitive adhesive layer with the resin layer becomes relatively stronger than with the glass substrate and as a result, the peeling property in reworking process is satisfactory.

Hereinafter, an embodiment of the polarizing plate of the present invention will be described with reference to the drawing.

FIG. 1 is a cross-sectional view schematically showing an embodiment of the polarizing plate of the present invention. In addition, FIG. 1 is a schematic view and the thickness and positional relationships between respective layers do not necessarily correspond to actual thickness and positional relationships.

A polarizing plate 100 shown in FIG. 1 comprises a polarizer protective film 16, a polarizer 12, and a resin layer 14. As shown in FIG. 1, the resin layer 14 is arranged directly on the surface of the polarizer 12 and functions as a polarizer protective film. On the surface of the polarizer 12 on the opposite side of the resin layer 14, the polarizer protective film 16 is arranged.

In addition, in the present invention, instead of the polarizer protective film 16, the resin layer 14 may be provided on both surfaces of the polarizer 12.

Hereinafter, in addition to the polarizer and the resin layer constituting the polarizing plate of the present invention, an arbitrary pressure sensitive adhesive layer, a polarizer protective film, and the like will be described in detail.

<Polarizer>

The polarizer included in the polarizing plate of the present invention is not particularly limited as long as the polarizer is made of a material having a function of converting light into specified linearly polarized light and an absorption type polarizer and a reflective type polarizer, which are conventionally well-known, can be used.

As the absorption type polarizer, an iodine-based polarizer, a dye-based polarizer using a dichroic dye, a polyene-based polarizer and the like may be used. The iodine-based polarizer and the dye-based polarizer include a coating type polarizer and a stretch type polarizer and any of these can be applied. However, a polarizer prepared by adsorbing iodine or a dichroic dye onto polyvinyl alcohol and stretching the polyvinyl alcohol is preferable.

In addition, examples of a method of obtaining a polarizer by subjecting a laminated film obtained by forming a polyvinyl alcohol layer on the substrate to stretching and dyeing include methods disclosed in JP5048120B, JP5143918B, JP5048120B, JP4691205B. JP4751481B, and JP4751486B. Well-known arts regarding these polarizers can be preferably used.

As the reflective type polarizer, a polarizer obtained by laminating thin films having different birefringences, a wire grid type polarizer, a polarizer obtained by combining a cholesteric liquid crystal having a selective reflection region with a ¼ wavelength plate, and the like may be used.

Among these, from the viewpoint of excellent adhesiveness with the resin layer, which will be described later, the reflective type polarizer is preferably a polarizer including a polyvinyl alcohol-based resin (polymer including —$CH_2$—CHOH— as a repeating unit, particularly, at least one selected from the group consisting of polyvinyl alcohol and ethylene-vinyl alcohol copolymers).

The thickness of the polarizer is 20 µm or less, and from the viewpoint of excellent handleability and excellent optical properties, the thickness is preferably 3 µm to 20 µm and more preferably 4 µm to 15 µm. As long as the thickness is within the above range, the polarizer can be suitably used when a thin image display device is formed.

<Resin Layer>

The resin layer (cured resin layer) of the polarizing plate of the present invention is a layer which protects the polarizer and imparts mechanical strength to the polarizing plate. The resin layer is in direct contact with the polarizer.

In the present invention, the hydrogen bonding component of surface free energy of the resin layer is 3.5 mN/m or more, more preferably 4.0 mN/m or more, and still more preferably 4.5 mN/m or more.

Here, the surface free energy mentioned in the present invention is obtained from respective contact angles $\theta_{H2O}$ and $\theta_{CH2I2}$ between pure water $H_2O$ and methylene iodide $CH_2I_2$ actually measured with reference to D. K. Owens: J. Appl. Polym. Sci., 13, 1741 (1969) by the following simultaneous expressions (A) and (B)

[Simultaneous Expressions]

$$1+\cos\theta_{H2O}=2\sqrt{\gamma s^d}(\sqrt{\gamma_{H2O}^d/\gamma_{H2O}^v})+2\sqrt{\gamma S^h}(\sqrt{\gamma_{H2O}^h/\gamma_{H2O}^v}) \quad (A)$$

$$1+\cos\theta_{CH2I2}=2\sqrt{\gamma s^d}(\sqrt{\gamma_{CH2I2}^d/\gamma_{CH2I2}^v})+2\sqrt{\gamma S^h}(\sqrt{\gamma_{CH2I2}^h/\gamma_{CH2I2}^v}) \quad (B)$$

$\gamma_{H2O}^d=29.1$, $\gamma_{H2O}^h=43.7$, $\gamma_{H2O}^v=72.8$,
$\gamma_{CH2I2}^d=46.8$, $\gamma_{CH2I2}^h=4.0$, $\gamma_{CH2I2}^v=50.8$ Wherein, in the simultaneous expressions, $\gamma s^d$ corresponds to a dispersion force component of surface free energy, $\gamma s^h$ corresponds to a hydrogen bonding component of surface free energy, respectively, and a value $\gamma s^v$ ($=\gamma s^d+\gamma s^h$) represented by a sum of these is defined as surface free energy.

The contact angle is measured by adjusting the humidity of a sample under the conditions of 25° C. and a relative humidity of 60% using a Drop Master 500 (manufactured by Kyowa Interface Science Co., Ltd.) for 24 hours, then respectively adding 10 μl of pure water and methylene iodide dropwise to the surface of the sample under the conditions, and measuring the contact angle after 30 seconds has passed from the dropwise addition of the pure water and methylene iodide.

The average thickness of the resin layer is not particularly limited and from the viewpoint of handleability and the like, the average thickness is preferably 0.2 μm to 15 μm and more preferably 0.5 μm to 10 μm.

Here, the film thickness can be measured by using an existing film thickness meter, a reflection spectral thickness meter (FE-3000, manufactured by Otsuka Electronics Co., Ltd.). In addition, the cross section of the resin layer may be directly measured by observing a microscope or a SEM.

The average thickness is a value obtained by measuring the thicknesses at arbitrary 5 points or more 10 mm or more apart from one another in the resin layer and arithmetically averaging these thicknesses.

In addition, it is preferable that the resin layer satisfies the following expressions (X) and (Y) from the viewpoint of preventing yellow tinting when an image display device is visually observed in an inclined direction. The expression (Y) means that the absolute value of Rth(550) is 10 nm or less. In other words, −10 nm≤Rth(550)≤10 nm is satisfied.

$Re(550)\leq 10$ nm   Expression (X)

$|Rth(550)|\leq 10$ nm   Expression (Y)

Here, Re(550) represents an in-plane retardation (nm) at a wavelength of 550 nm and Rth(550) represents a retardation (nm) in a thickness direction at a wavelength of 550 nm.

From the viewpoint of transmitted polarized light being hardly affected, Re(550) of the resin layer is preferably 5 nm or less and more preferably 3 nm or less. In addition, for the same reason, |Rth(550)| of the resin layer is preferably 5 nm or less and more preferably 3 nm or less.

Re(550) and Rth(550) of the resin layer can be measured using a phase difference measuring device such as KOBRA 21ADH or WR (manufactured by Oji Scientific Instruments), and AXOSCAN (manufactured by AXOMETRICS, Inc.).

It is preferable that the resin layer of the polarizing plate of the present invention is a layer obtained by polymerizing and curing a polyfunctional monomer because the hardness of the resin layer is satisfactory at the time of laminating the layer on a display device, and it is more preferable that the polymerizable group the included in the polyfunctional monomer is a (meth)acryloyl group.

In addition, it is still more preferable that the resin layer is a layer obtained by polymerizing and curing a boronic acid monomer having a boronic acid group represented by Formula (1) which will be described later and a polymerizable group and a polyfunctional monomer because the adhesiveness between the polarizer and the resin layer becomes satisfactory.

Hereinafter, first, the raw material for the resin layer (such as a polyfunctional monomer or a boronic acid monomer) will be described in detail and then the production procedure of the resin layer and the like will be described in detail.

(Polyfunctional Monomer)

The polyfunctional monomer has plural polymerizable groups. The polyfunctional monomer is a compound that can be polymerized by using light or heat and is a component that constitutes the resin layer through polymerization curing.

Here, the polymerizable group is preferable a group capable of conducting an addition polymerization reaction or a polycondensation reaction. For such a polymerizable group, a polymerizable ethylenically unsaturated group is preferable and specifically, a (meth)acryloyl group is preferable.

The number of polymerizable groups included in the polyfunctional monomer is not particularly limited and there may be plural (2 or more) polymerizable groups. From the viewpoint of more excellent surface hardness in the polarizing plate, the number of polymerizable groups is preferably 3 to 32 and more preferably 3 to 20.

Specific examples of the polyfunctional monomer include polyfunctional (meth)acrylates such as ethylene glycol di(meth)acrylate, triethylene glycol di(meth)acrylate, tetramethylene glycol di(meth)acrylate, propylene glycol di(meth)acrylate, polyethylene glycol di(meth)acrylate, polypropylene glycol di(meth)acrylate, 1,3-butanediol di(meth)acrylate, trimethylolethane triacrylate, trimethylolpropane tri(meth)acrylate, trimethylolpropane di(meth)acrylate, neopentyl glycol di(meth)acrylate, pentaerythritol tetra(meth)acrylate, pentaerythritol tri(meth)acrylate, pentaerythritol hexa(meth)acrylate, dipentaerythritol hexa(meth)acrylate, dipentaerythritol penta(meth)acrylate, 1,4-hexanediol (meth)acrylate, hexanediol di(meth)acrylate, trimethylolpropane tri(acryloyloxy propyl)ether, tri(acryloyloxy ethyl)isocyanurate, tri(acryloyloxy ethyl)cyanurate, glycerin tri(meth)acrylate, and compounds obtained by (meth)acrylation after adding ethylene oxide or propylene oxide to a polyfunctional alcohol such as trimethylolpropane or glycerin and allowing the mixture to react.

These polyfunctional monomers may be used alone or in a combination of two or more thereof.

(Boronic Acid Monomer)

The boronic acid monomer is a compound having a boronic acid group represented by the following Formula (1) and a polymerizable group and has a function of enhancing the adhesiveness between the polarizer and the resin layer as described above.

Formula (1)

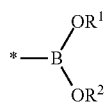

In the Formula (1), $R^1$ and $R^2$ each independently represent a hydrogen atom, or a substituted or unsubstituted aliphatic hydrocarbon group, aryl group or heterocyclic group.

Examples of the aliphatic hydrocarbon group include a substituted or unsubstituted linear or branched alkyl group having 1 to 20 carbon atoms (for example, a methyl group, an ethyl group, an iso-propyl group, and the like), a substituted or unsubstituted cyclic alkyl group having 3 to 20 carbon atoms (for example, a cyclohexyl group and the like), and an alkenyl group having 2 to 20 carbon atoms (for example, a vinyl group and the like).

Examples of the aryl group include a substituted or unsubstituted phenyl group having 6 to 20 carbon atoms (for example, a phenyl group, a tolyl group, and the like), and a substituted or unsubstituted naphthyl group having 10 to 20 carbon atoms.

The heterocyclic group is a substituted or unsubstituted 5-membered or 6-membered ring group including at least one heteroatom (for example, a nitrogen atom, an oxygen atom, a sulfur atom, and the like) and examples thereof include a pyridyl group, an imidazolyl group, a furyl group, a piperidyl group, and a morpholino group. $R^1$ and $R^2$ may be linked to each other to form a ring, and for example, isopropyl groups of $R^1$ and $R^2$ may be linked to each other to form a 4,4,5,5-tetramethyl-1,3,2-dioxaboran ring.

In the Formula (1), the case in which $R^1$ and $R^2$ are hydrogen atoms or liner or branched alkyl groups having 1 to 3 carbon atoms and $R^1$ and $R^2$ are linked to each other to form a ring is preferable, and $R^1$ and $R^2$ are most preferably hydrogen atoms.

In the Formula (1), * indicates a bonding position.

The number of boronic acid groups represented by the Formula (1) is not particularly limited and there may be one boronic acid group or plural (2 or more) boronic acid groups.

One or more hydrocarbon groups included in these aliphatic hydrocarbon group, aryl group, and heterocyclic group may be substituted with an arbitrary substituent. Examples of the type of the substituent include substituents as described in the paragraph "0046" of JP2013-054201A.

The type of the polymerizable group is not particularly limited and examples thereof include a radically polymerizable group and a cationically polymerizable group. Examples of the radically polymerizable group include a (meth)acryloyl group, an acrylamide group, a vinyl group, a styryl group, and an allyl group. Examples of the cationically polymerizable group include a vinyl ether group, an oxiranyl group, and an oxetanyl group. Among these, a (meth)acryloyl group, a styryl group, a vinyl group, an oxiranyl group or an oxetanyl group is preferable, a (meth)acryloyl group or a styryl group is more preferable, and a (meth)acryloyl group is particularly preferable.

The number of polymerizable groups is not particularly limited and there may be one polymerizable group or plural (2 or more) polymerizable groups.

The molecular weight of the boronic acid monomer is not particularly limited. From the viewpoint of excellent compatibility with the polyfunctional monomer, the molecular weight of the boronic acid monomer is preferably 120 to 1,200 and more preferably 180 to 800.

A preferable embodiment of the boronic acid monomer is a boronic acid monomer represented by the following Formula (2) from the viewpoint of more excellent adhesiveness between the polarizer and the resin layer.

Formula (2)

In the Formula (2), the definition of $R^1$ and $R^2$ is as follows.

Z represents a polymerizable group. The definition of the polymerizable group is as follows.

$X^1$ represents a single bonding or a divalent linking group. Examples of the divalent linking group include a divalent linking group selected from —O—, —CO—, —NH—, —CO—NH—, —COO—, —O—COO—, an alkylene group, an arylene group, a heterocyclic group (heteroaryl group), and combinations thereof.

Examples of the combinations include -arylene group-COO-arylene group-O-alkylene group- and -arylene group-COO-alkylene group.

Hereinafter, specific examples of the boronic acid monomer will be shown. However, the present invention is not limited thereto.

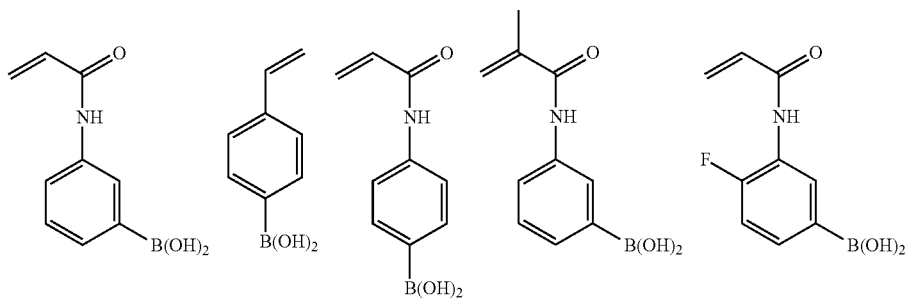

-continued
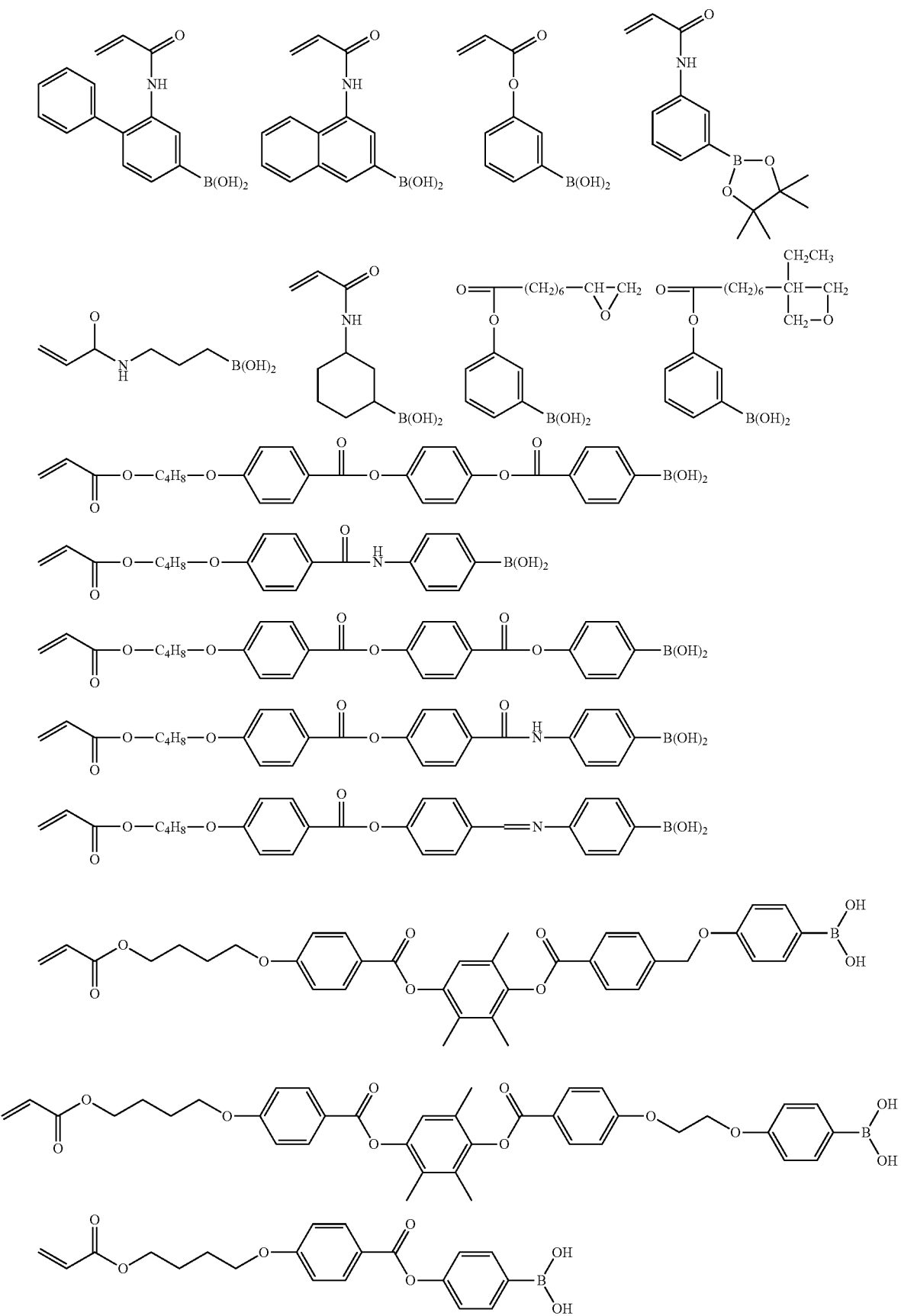

-continued

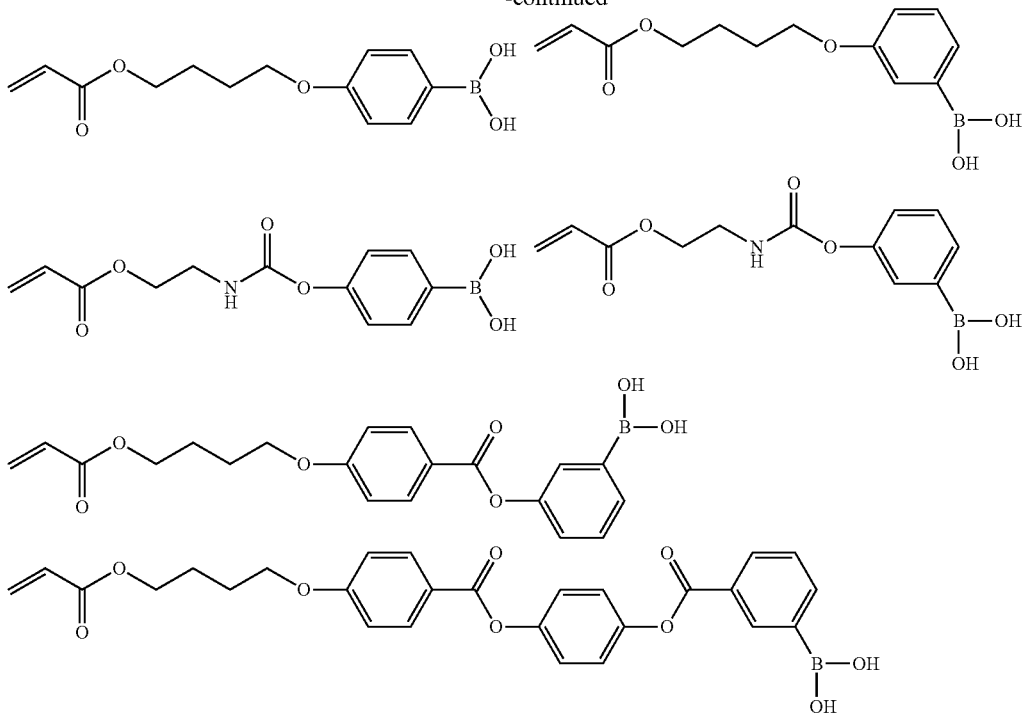

The mass ratio between the above-mentioned boronic acid monomer and polyfunctional monomer is not particularly limited. However, from the viewpoint of excellent durability of the polarizer in the polarizing plate under a high temperature high humidity condition, the mass ratio of the boronic acid monomer (mass of boronic acid monomer/(total mass of boronic acid monomer and polyfunctional monomer)) is preferably 0.0005% by mass to 20.0% by mass, more preferably 0.005% by mass to 11.0% by mass, and still more preferably 0.05% by mass to 9.0% by mass with respect to the total mass of the boronic acid monomer and the polyfunctional monomer.

(Production Method of Resin Layer)

The method of producing the resin layer is not particularly limited as long as a resin layer that is in direct contact with a polarizer can be produced. From the viewpoint of the ease of control of the thickness of the resin layer, a production method of applying a resin layer forming composition including the above-described boronic acid monomer and polyfunctional monomer directly onto a polarizer and polymerizing and curing the composition may be suitably used.

Hereinafter, an embodiment using the resin layer forming composition will be described in detail.

The above-described boronic acid monomer and the above-described polyfunctional monomer are included in the resin layer forming composition. The mass ratio between the boronic acid monomer and the polyfunctional monomer is not particularly limited. However, the mass ratio therebetween preferably satisfies the mass ratio of the above-described boronic acid monomer (mass of boronic acid monomer/(total mass of boronic acid monomer and polyfunctional monomer)).

In addition, the resin layer forming composition may include components other than the above-described boronic acid monomer and the above-mentioned polyfunctional monomer and for example, a polymerization initiator may be included therein.

The type of the polymerization initiator is not particularly limited and an optimal compound is selected according to the type of the polymerization initiator. More specifically, a photopolymerization initiator, a thermal polymerization initiator, and the like may be used.

Examples of the photopolymerization initiator include alkyne phenone-based, acyl phosphine oxide-based, and titanocene-based polymerization initiators. Examples of the thermal polymerization initiator include ketone peroxide-based, peroxy ketal-based, hydroperoxide-based, dialkylperoxide-based, diacylperoxide-based, peroxydicarbonate-based and peroxyester-based polymerization initiators.

In addition, the resin layer forming composition may include various surfactants from the viewpoint of adjusting the hydrogen bonding component of surface free energy of the resin layer to be in a range of 3.5 mN/m or more.

The surfactant prevents film thickness unevenness resulting from drying unevenness by local distribution of dry air and the surface irregularity of the resin layer and cissing of a coating material can be improved (the surfactant functions as a leveling agent and can improve the surface state of the resin layer).

Specifically, it is preferable that the surfactant is a fluorine-based surfactant or a silicone-based surfactant. In addition, it is preferable that the surfactant is an oligomer or a polymer rather than a low molecular weight compound.

When the surfactant is added, the surfactant rapidly moves to the surface of the applied liquid film and is unevenly distributed. After the film is dried, the surfactant is unevenly distributed on the surface as it is. Thus, the surface energy of the resin layer to which the surfactant is added is reduced by the surfactant. From the viewpoint of preventing the film thickness irregularity or cissing and unevenness of the resin layer, it is preferable that the surface energy of the film is low.

Preferable embodiments and specific examples of the fluorine-based surfactant are described in paragraphs "0023" to "0080" of JP2007-102206A, and the same will be applied in the present invention.

Preferable examples of the silicone-based surfactant include surfactants having substituents at the terminal and/or the side chain of the compound chain including plural dimethylsiloxy units as a repeating unit. In the compound chain including plural dimethylsiloxy units as a repeating unit, structural units other than the dimethylsiloxy unit may be included. The substituents may be the same or different from each other and plural substituents are preferable. Examples of preferable substituents include groups including a polyether group, an alkyl group, an aryl group, an aryloxy group, a cinnamoyl group, an oxetanyl group, a fluoroalkyl group, and a polyoxyalkylene group.

Preferable examples of the silicone-based surfactant include "X-22-174DX", "X-22-2426", "X22-164C", and "X-22-176D" (all of which are trade names) manufactured by Shin-Etsu Chemical Co., Ltd.; "FM-7725", "FM-5521", and "FM-6621" (all of which are trade names) manufactured by Chisso Corporation; "DMS-U22" and "RMS-033" (all of which are trade names) manufactured by Gelest; "SH200", "DC11PA", "ST80PA", "L7604", "FZ-2105", "L-7604", "Y-7006", and "SS-2801" (all of which are trade names) manufactured by Dow Corning Toray Co., Ltd.; and "TSF400" (trade name) manufactured by Momentive Performance Materials Inc. However, the surfactant is not limited thereto.

The molecular weight of the surfactant is not particularly limited and is preferably 100,000 or less, more preferably 50,000 or less, particularly preferably 1,000 to 30,000, and most preferably 1,000 to 20,000.

The content of the surfactant in the resin layer forming composition is not particularly limited and the content of the surfactant with respect to the total mass of the resin layer to be formed is preferably adjusted to 0.01% by mass to 0.5% by mass and more preferably adjusted to 0.01% by mass to 0.3% by mass.

The resin layer forming composition may include a solvent as required. Examples of the solvent include water and an organic solvent.

In addition, various additives other than the above additives can be added to the resin layer forming composition within the range not deteriorating the properties. Examples of various additives include an ultraviolet absorbent, an antioxidant, a photostabilizer, an organic/inorganic filler, a plasticizer, a flame retardant, a heat stabilizer, a lubricant, an antistatic agent, a releasing agent, a foaming agent, a nucleating agent, a coloring agent, a crosslinking agent, a dispersion aid, a leveling agent, and a resin component.

The method of applying the resin layer forming composition onto the polarizer is not particularly limited and well-known application methods can be adopted. Examples thereof include gravure coating, roll coating, reverse coating, knife coating, die coating, lip coating, doctor coating, extrusion coating, slide coating, wire bar coating, curtain coating, extrusion coating, and spin coating.

After the resin layer forming composition is applied, the coating layer of the composition may be dried as required to remove a solvent. The method of drying treatment is not particularly limited and examples thereof include an air-drying treatment and a heating treatment.

The method of polymerizing and curing the coating layer of the composition obtained by the above application is not particularly limited and examples thereof include a heating treatment and a light irradiation treatment.

The conditions for the heating treatment vary depending on materials to be used and from the viewpoint of more excellent reaction efficiency, the heating treatment is preferably performed at a temperature of 40° to 120° C. (preferably 50° C. to 80° C.) for 0.5 minutes to 10 minutes (preferably 1 minute to 5 minutes).

The conditions for the light irradiation treatment are not particularly limited and an ultraviolet ray irradiation method of generating and emitting ultraviolet rays and carrying out photocuring is preferable. Examples of an ultraviolet lamp used in such a method include a metal halide lamp, a high-pressure mercury lamp, a low-pressure mercury lamp, a pulsed xenon lamp, a xenon/mercury mixed lamp, a low-pressure bactericidal lamp, and an electrodeless lamp. Among these ultraviolet lamps, a metal halide lamp or high-pressure mercury lamp is preferably used.

In addition, although irradiation conditions vary depending on the conditions of the respective lamps, typically, the irradiation exposure dose may be about 20 mJ/cm$^2$ to 10,000 ml/cm$^2$ and is preferably 100 mJ/cm$^2$ to 3,000 mJ/cm$^2$.

<Pressure Sensitive Adhesive Layer>

In the polarizing plate of the present invention, a pressure sensitive adhesive used when the polarizing plate is laminated on an image display device may be provided on the polarizing plate side, that is, on the above-mentioned resin layer as a pressure sensitive adhesive layer in advance.

In an embodiment in which the pressure sensitive adhesive layer is provided on the resin layer, the hydrogen bonding component of surface free energy of the resin layer is 3.5 mN/m or more and thus the adhesiveness between the resin layer and the pressure sensitive adhesive layer is 6.0 N/25 mm or more and is preferably 8.0 N/25 mm and more preferably 10.0 N/25 mm or more.

Here, the adhesiveness measurement described in the present invention is carried out by the following procedures. First, the resin layer that is formed directly on the polarizer is pressed against a peeling film with the pressure sensitive adhesive layer and then the layers are cut into a width of 25 mm and a length of 160 mm. Subsequently, the protective film side of the polarizing plate (opposite side of the peeling film surface of the polarizer) is laminated on the surface of glass, which has been washed and dried, with a pressure sensitive adhesive that is separately prepared. The laminate is used as a sample for measurement. Only the peeling film of the sample for measurement is peeled off by using a tensile tester under the conditions of 25° C. and a peeling rate of 300 mm/min, and 180° peeling based on JIS Z 0237 and the adhesiveness between the resin layer and the pressure sensitive adhesive layer in the polarizing plate is measured.

The pressure sensitive adhesive used for such a pressure sensitive adhesive layer is not particularly limited and because the adhesiveness between the resin layer and the pressure sensitive adhesive layer is easily set to be in the above range, for example, pressure sensitive adhesives such as an acrylic adhesive including an acrylic polymer, a pressure sensitive adhesive including a silicone-based polymer, and a pressure sensitive adhesive including a rubber-based polymer can be preferably used.

Among these, because excellent adhesiveness and handleability are attained, an acrylic adhesive including an acrylic polymer is preferable.

In the present invention, because peeling property in reworking process can be further improved by further improving the adhesiveness with the resin layer, it is preferable that a component having an isocyanate group is further used as the material constituting the pressure sensitive adhesive layer.

Examples of the component having an isocyanate group include conventionally well-known curing agents. Specific examples thereof include polyisocyanate compounds such as m-xylylene diisocyanate, toluene-2,4-diisocyanate, hexamethylene diisocyanate, and isophorone diisocyanate; and silyl isocyanate compound such as methyl silyl triisocyanate.

In addition, from the viewpoint of adjusting the adhesiveness between the resin layer and the pressure sensitive adhesive layer to be in a range of 6.0 N/25 mm or more, the pressure sensitive adhesive layer may include various surfactants.

Examples of the surfactants include the above-mentioned surfactants described as arbitrary components of the resin layer.

<Polarizer Protective Film>

In the polarizing plate of the present invention, the polarizer protective film may be provided on the surface of the polarizer on the opposite side of the resin layer side as shown in FIG. 1.

In the case in which the polarizing plate including the polarizer protective film is included in an image display device, it is preferable that the polarizer protective film is arranged so as to be directed to a visible side (outer side).

The optical properties of the polarizer protective film are not particularly limited and in the case in which the polarizing plate is used in an image display device and the polarizer protective film is arranged on the visible side, from the viewpoint of attaining more excellent light resistance in the polarizer in the polarizing plate, the maximum transmittance at a wavelength of 300 nm to 380 nm is preferably 15% or less and more preferably 7% or less. The maximum transmittance can be measured by using a spectrophotometer such as a spectrophotometer UV-3150 (manufactured by Shimadzu Corporation).

In order to set the maximum transmittance to be in the above range, the polarizer protective film may include an ultraviolet absorbent. As the ultraviolet absorbent, well-known ultraviolet absorbents can be used. Examples thereof include benzotriazole-based, benzophenone-based, salicylic acid phenyl ester-based, triazine-based ultraviolet absorbents.

The content of the ultraviolet absorbent in the resin layer is not particularly limited and from the viewpoint of preventing bleeding from the resin layer after being polymerized and cured and attaining a good balance among high hardness, visibility, and UV blocking properties of the resin layer, the content thereof is preferably 2% by mass to 25% by mass with respect to the total mass of the resin layer.

The constitution of the polarizer protective film is not particularly limited and the polarizer protective film may be, for example, a so-called transparent support, a hard coat layer, or an antiglare layer, and may be a laminate of a transparent support, a hard coat layer, and an antiglare layer.

As the hard coat layer and the antiglare layer, well-known layers can be used. For example, a layer obtained by polymerizing and curing the above-motioned polyfunctional monomer may be used. In order to impart anti-glare characteristic (surface scattering) or internal scattering to the hard coat layer and the antiglare layer, the same material as the material of the aforementioned resin layer can be used.

In addition, as the transparent support, well-known transparent supports can be used. For example, as the material for forming the transparent support, a cellulose-based polymer (hereinafter, also referred to as cellulose acylate), represented as triacetyl cellulose, a thermoplastic norbornene-based resin (ZEONEX and ZEONOR, manufactured by Zeon Corporation, ARTON, manufactured by JSR Corporation, and the like), an acrylic resin, and a polyester-based resin can be used.

The thickness of the polarizer protective film is not particularly limited and the thickness is preferably 40 pun or less and more preferably 25 µm or less because the thickness of the polarizing plate can be made thin.

<Polarizing Plate and Application>

As described above, the polarizing plate of the present invention has at least a polarizer, a resin layer, an arbitrary pressure sensitive adhesive layer, and an arbitrary polarizer protective film. However, the polarizing plate may include other layers within the range not deteriorating the effect of the invention.

[Image Display Device]

The image display device of the present invention is an image display device including the above-mentioned polarizing plate of the present invention.

Specifically, by arranging the polarizing plate of the present invention in the optical path of the image display device, for example, at least on one side of a liquid crystal cell of a liquid crystal display device, and the like, the image display device of the present invention, for example, a liquid crystal display device, can be obtained.

Liquid crystal display devices are proposed in various modes depending on the type of the liquid crystal cell to be used. However, in any case, the polarizing plate of the present invention can be used. For example, the polarizing plate of the present invention can be used for various modes of liquid crystal display devices such as vertical alignment (VA) type, in-plane-switching (IPS) type, optically compensatory bend (OCB) type, twisted nematic (TN) type, super-twisted nematic (STN) type liquid crystal display devices.

A phase difference layer for improving view angle properties and contrast may be inserted between the polarizing plate of the present invention and the liquid crystal cell. The phase difference layer varies depending on the type of the liquid crystal cell to be used. In the case of the VA type, a negative-C-plate and an A-plate, a negative-C-plate, and the like may be used. In the case of the IPS type, a biaxial-plate, a positive-C-plate, and the like may be used. In the case of the TN type, a layer having a discotic liquid crystal fixed in hybrid alignment, and the like may be used. In the case of the STN type, a biaxial-plate and the like may be used.

EXAMPLES

Hereinafter, the characteristics of the present invention are described in more detail with reference to Examples. In the following Examples, materials, used amounts, ratios, the details of treatments, and the treatment procedures may be suitably modified within the range not departing from the scope of the present invention. Accordingly, the range of the present invention should not be limitatively interpreted by Examples described below.

<Preparation of Film 1>

(Preparation of Cellulose Ester Solution for Air Layer)

The following composition was put into a mixing tank and was stirred while being heated to dissolve the respective components. Thus, a cellulose ester solution for an air layer was prepared.

Composition of Cellulose Ester Solution for Air Layer

| | |
|---|---|
| Cellulose ester (acetyl substitution degree: 2.86) | 100 parts by mass |
| Sugar ester compound of Formula (R-I) | 3 parts by mass |
| Sugar ester compound of Formula (R-II) | 1 part by mass |
| Ultraviolet absorbent mentioned below | 2.4 parts by mass |
| Silica particle dispersion liquid (AEROSIL R972, average particle diameter: 16 nm, manufactured by Nippon Aerosil Co., Ltd.) | 0.026 parts by mass |
| Methylene chloride | 339 parts by mass |
| Methanol | 74 parts by mass |
| Butanol | 3 parts by mass |

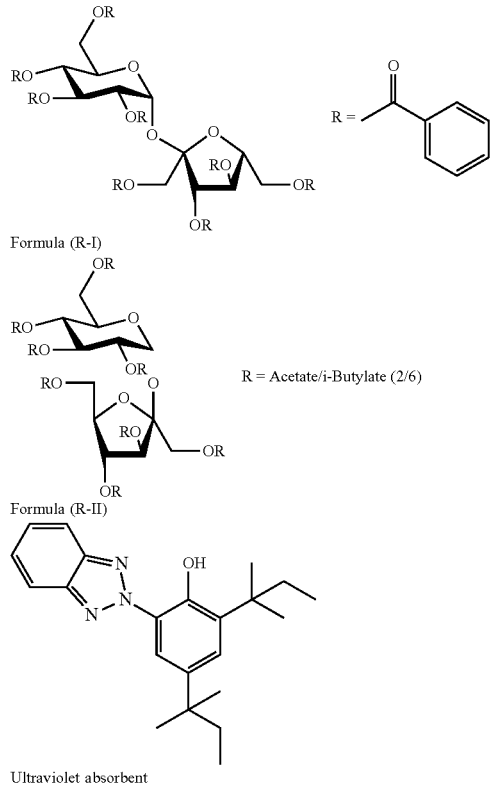

Formula (R-I)

Formula (R-II)   R = Acetate/i-Butylate (2/6)

Ultraviolet absorbent (Preparation of Cellulose Ester Solution for Drum Layer)

The following composition was put into a mixing tank and was stirred while being heated to dissolve the respective components. Thus, a cellulose ester solution for a drum layer was prepared.

Preparation of Cellulose Ester Solution for Drum Layer

| | |
|---|---|
| Cellulose ester (acetyl substitution degree: 2.86) | 100 parts by mass |
| Sugar ester compound of Formula (R-I) | 3 parts by mass |
| Sugar ester compound of Formula (R-II) | 1 part by mass |
| Ultraviolet absorbent | 2.4 parts by mass |
| Silica particle dispersion liquid (AEROSIL R972, average particle diameter: 16 nm, manufactured by Nippon Aerosil Co., Ltd.) | 0.091 parts by mass |
| Methylene chloride | 339 parts by mass |
| Methanol | 74 parts by mass |
| Butanol | 3 parts by mass |

(Preparation of Cellulose Ester Solution for Core Layer)

The following composition was put into a mixing tank and was stirred while being heated to dissolve the respective components. Thus, a cellulose ester solution for a core layer was prepared.

Composition of Cellulose Ester Solution for Core Layer

| | |
|---|---|
| Cellulose ester (acetyl substitution degree: 2.86) | 100 parts by mass |
| Sugar ester compound of Formula (R-I) | 8.3 parts by mass |
| Sugar ester compound of Formula (R-II) | 2.8 parts by mass |
| Ultraviolet absorbent mentioned above | 2.4 parts by mass |
| Methylene chloride | 266 parts by mass |
| Methanol | 58 parts by mass |
| Butanol | 2.6 parts by mass |

(Film Formation by Co-Casting)

As a casting die, a device provided with a feed block adjusted for co-casting such that a film of a three-layered structure can be formed was used. The cellulose ester solution for an air layer, the cellulose ester solution for a core layer, and the cellulose ester solution for a drum layer were co-cast on a drum cooled to −7° C. from casting ports. At this time, the amount of each dope is adjusted such that the thickness ratio is air layer/core layer/drum layer=7/90/3.

These solutions were cast on a mirror surface stainless steel support, which is a drum having a diameter of 3 m. Dry air at 34° C. was blown onto the drum at 270 m$^3$/min.

A cellulose ester film which was obtained by rotating by casting from the drum before 50 cm from the end point portion of the casting portion and then both ends thereof were clipped with the pin tenter. At the time of the peeling-off of the film, the film was stretched by 5% in the conveyance direction (longitudinal direction).

The cellulose ester web fixed by the pin tenter was conveyed to a drying zone. At the beginning of drying, dry air was blown at 45° C. and then drying was performed at 110° C. for 5 minutes. At this time, the cellulose ester web was conveyed while being stretched at a stretching ratio of 10% in a width direction.

When the web was detached from the pin tenter, the portions fixed by the pin tenter were continuously cut and irregular shapes of a width of 15 mm and a height of 10 μm were formed at the both ends of the web in the width direction. At this time, the width of the web was 1,610 mm. While a tensile stress of 210 N was applied to the web in the conveyance direction, the web was dried at 140° C. for 10 minutes. Further, the end portions of the web in the width direction were continuously cut such that the web had a desired width and thus a cellulose ester film having a film thickness of 41 μm was prepared.

(Preparation of Hard Coat Layer)

As a hard coat layer forming coating liquid, the following curable resin composition was prepared.

(Curable Resin Composition)

| | |
|---|---|
| KAYARAD DPHA [manufactured by Nippon Kayaku Co., Ltd.] | 48.5 parts by mass |
| KAYARAD PET30 [manufactured by Nippon Kayaku Co., Ltd.] | 48.5 parts by mass |
| IRGACURE 127: polymerization initiator [manufactured by BASF] | 3.0 parts by mass |
| Toluene | 97.0 parts by mass |
| Cyclohexanone | 3.0 parts by mass |

The curable resin composition was applied onto the above-prepared cellulose ester film by a die coating method using the slot die described in Example 1 of JP2006-122889A at a conveyance rate of 30 m/min and the composition was dried at 60° C. for 60 seconds. Thereafter, the coating layer was cured upon irradiation with ultraviolet rays having an illuminance of 400 mW/cm$^2$ and an irradiation dose of 390 mJ/cm$^2$ by using an air-cooled metal halide lamp (manufactured by Eyegraphics Co., Ltd.) of 160 W/cm under purging with nitrogen (oxygen concentration of about 0.1%), followed by winding up. The amount of coating was adjusted such that the film thickness of the cured layer was 4 μm. In this manner, a film 1 with a hard coat layer having a total film thickness of 45 μm (hereinafter, simply referred to as "film 1") was prepared.

<Preparation of Film 2>
(Preparation of Cellulose Ester Solution 2 for Core Layer)

The following composition was put into a mixing tank under stirring to dissolve each component. Thus, a cellulose ester solution 2 for a core layer was prepared.

Composition of Cellulose Ester Solution 2 for Core Layer

| | |
|---|---|
| Cellulose acetate (acetyl substitution degree: 2.88) | 100 parts by mass |
| Ester oligomer (Compound 1-1) | 10 parts by mass |
| Durability improver (Compound 1-2) | 4 parts by mass |
| Ultraviolet absorbent (Compound 1-3) | 3 parts by mass |
| Methylene chloride (first solvent) | 438 parts by mass |
| Methanol (second solvent) | 65 parts by mass |

(Compound 1-1)

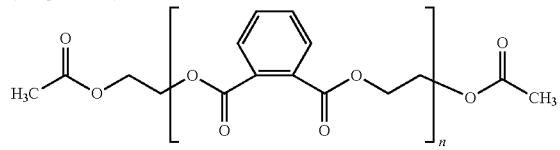

Molecular weight: 1,000
(Compound 1-2)

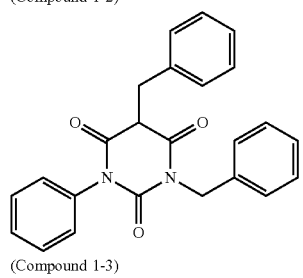

(Compound 1-3)

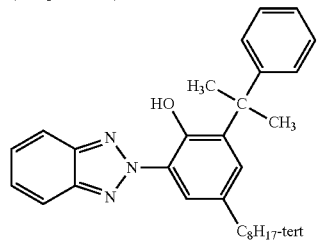

(Preparation of Cellulose Ester Solution 2 for Air Layer)

10 parts by mass of the following matting agent dispersion liquid was added to 190 parts by mass of the cellulose ester solution 2 for a core layer and thus a cellulose ester solution 2 for an air layer was prepared.

Composition of Matting Agent Dispersion Liquid

| | |
|---|---|
| Silica particles having an average panicle size of 20 nm (AEROSIL R972, manufactured by Nippon Aerosil Co., Ltd.) | 2 parts by mass |
| Methylene chloride (first solvent) | 76 parts by mass |
| Methanol (second solvent) | 11 parts by mass |
| Cellulose ester solution 2 for core layer | 1 part by mass |

(Formation of Cellulose Ester Film)

Three layers of the cellulose ester solution for a core layer and a cellulose ester solution for an outer layer on both sides thereof were cast on the drum at 20° C. from the casting ports at the same time. In a state in which the content of the solvent was about 20% by mass, the film was peeled off and the both ends of the film in the width direction were fixed by a tenter clip. In a state in which the amount of the residual solvent was 3% by mass to 15% by mass, the film was dried while being stretched in the horizontal direction by 1.2 times. Thereafter, the stretched film was conveyed between rolls in a heat treatment device. Thus, a cellulose ester film having a film thickness of 25 μm was prepared.

Subsequently, in the same procedures as the procedures of the film 1, a hard coat layer was formed on the cellulose ester film having a film thickness of 25 μm and a film 2 having a hard coat layer having a total film thickness of 29 μm (hereinafter, simply referred to as "film 2") was prepared.

<Polarizing Plate of Comparative Example 1>

The film 1 with a hard coat layer was prepared and was immersed in 1.5 mol/L of an aqueous NaOH solution (saponified solution) held at 55° C. and then the immersed film was washed with water.

Thereafter, the film was immersed in 0.05 mol/L of an aqueous sulfuric acid solution at 25° C. for 30 seconds and then washing is carried out in a washing bath under flowing water for 30 seconds so that the film was in a neutral state. Then, dewatering using an air knife was repeated 3 times and after water was removed, the film was left to stay in a drying zone at 70° C. for 15 seconds for drying. Thus, a saponified film was prepared.

The saponified film 1 with a hard coat layer was laminated on a polarizer (polyvinyl alcohol-based resin containing polarizer) having a film thickness of 20 μm using a polyvinyl alcohol-based adhesive, and the laminate was dried at 70° C. for 10 minutes or longer, thereby preparing a polarizing plate A. Here, the polarizer and the film were arranged such that the transmission axis of the polarizer was orthogonal to the conveyance direction of the film. At the time of lamination, the lamination was carried out such that the film side of the film 1 with a hard coat layer was directed to the polarizer side.

A curable resin composition 4 described later was applied onto the surface of the polarizer on the opposite side of the film 1 with a hard coat layer in the prepared polarizing plate A by a die coating method using the slot die described in Example 1 of JP2006-122889A at a conveyance rate of 24 m/min and the curable resin composition was dried at 60° C. for 60 seconds. Thereafter, the coating layer was cured upon irradiation with ultraviolet rays having an illuminance of 400 mW/cm² and an irradiation dose of 390 mJ/cm² under purging with nitrogen (oxygen concentration of about 0.1%) by using an air-cooled metal halide lamp (manufactured by Eyegraphics Co., Ltd.) of 160 W/cm, followed by winding up. The coating amount was adjusted such that the film thickness of the cured layer was 2 μm. In this manner, a polarizing plate of Comparative Example 1 was prepared.

(Curable Resin Composition 4)

| | |
|---|---|
| A-TMMT [manufactured by Shin-Nakamura Chemical Co., Ltd.] | 100.0 parts by mass |
| Compound 1 | 0.5 parts by mass |
| Polymerization initiator (Irg 127, manufactured by BASF) | 3.0 parts by mass |
| Compound 4 | 0.2 parts by mass |
| Methylene chloride | 103.7 parts by mass |

Comparative Examples 2 to 4 and Examples 1 to 8

Polarizing plates of Comparative Examples 2 to 4 and Examples 1 to 8 were prepared in the same manner as in Comparative Example 1 except that the type of the curable resin composition and the cured layer, the type of the polarizer protective film, and the thickness of the polarizer were changed as shown in Table 3 below.

In the constitutions of Examples 1 to 8, the film 2 with a hard coat layer corresponds to the polarizer protective film 16 in FIG. 1.

In Table 1 below, the numerical value of the column of "composition" means mass parts of each component.

Each curable resin composition includes 103.7 parts by mass of methyl ethyl ketone as a solvent.

In Table 1 below, A-TMMT in the column of "polyfunctional monomer" means the following.

A-TMMT: A-TMMT [manufactured by Shin-Nakamura Chemical Co., Ltd.]

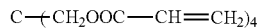

A-TMMT

In Table 1 below, Compound 1 in the column of "boronic acid monomer" means Compound 1 below.

Compound 1

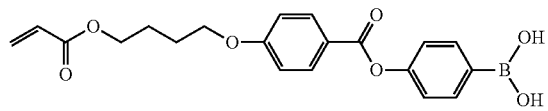

In Table 1 below, Irg 127 in the column of "polymerization initiator" means the following compound.

Irg 127: IRGACURE 127 (manufactured by BASF)

In Table 1 below, Compounds 2 to 4 in the columns of "Surfactant" means copolymers having a repeating unit in Table 2 below at a content (% by mole) in Table 2 below. The weight average molecular weight (Mw) is a measurement value obtained by GPC measurement (in terms of polystyrene).

In Table 1 below, Compound 5 in the column of "Other monomers" means the following compound.

Compound 5: Vinyl trimethoxysilane (KBM-1003, manufactured by Shin-Etsu Chemical Co., Ltd.)

In the column of "Cured layer" in Table 1 below, the irradiation dose when resin layers are formed by using each curable resin composition, the film thickness of the resin layers formed from each curable resin composition and Re(550) and Rth(550) of the resin layers formed from each curable resin composition are shown, respectively.

The resin layers formed in each Example are produced with the film thicknesses in Table 1 below.

Re(550) and Rth(550) of the resin layers formed from each curable resin composition were measured by AXOSCAN (manufactured by Axometrics Co., Ltd.).

The method of measuring Re(550) and Rth(550) is as follows. First, each curable resin composition was applied to PET having a thickness of 100 μm, and the coating was irradiated with ultraviolet rays having an illuminance of 400 mW/cm² and an irradiation dose of 390 mJ/cm² under purging with nitrogen (oxygen concentration of about 0.1%) by using an air-cooled metal halide lamp (manufactured by Eyegraphics Co., Ltd.) of 160 W/cm to cure the coating layer. Thus, a resin layer was formed. Thereafter, PET was peeled off and Re(550) and Rth(550) of only the resin layer were measured. The thickness of each resin layer (cured layer) was measured as the film thickness (μm) shown in Table 1.

In Table 3 below, the numbers of the curable resin compositions shown in Table 1 below will be shown in the column of "Type of curable resin composition".

In addition, the column of "resin layer" means the resin layer (cured layer) obtained from the curable resin composition and for example, the resin layer that is formed from the curable resin composition 1 is shown as Cured layer 1.

Various evaluations shown below were carried out by using the polarizing plates obtained in Examples and Comparative Examples shown in Table 3 below. The results are collectively shown in Table 3 below.

<Contact Angle>

The contact angle was measured by adjusting the humidity of each polarizing plate under the conditions of 25° C. and a relative humidity of 60% using a Drop Master 500 (manufactured by Kyowa Interface Science Co., Ltd.) for 24 hours, then respectively adding 10 μl of pure water and methylene iodide dropwise to the surface of the resin layer of each polarizing plate under the conditions, and measuring the contact angle after 30 seconds has passed from the dropwise addition of the pure water and methylene iodide. In addition, the hydrogen bonding component of the surface free energy was calculated from the contact angle of the measured pure water and methylene iodide with reference to D. K. Owens: J. Appl. Polym. Sci., 13, 1741 (1969).

<Adhesiveness>

The surface on the opposite side of the surface of the obtained polarizing plate on which the resin layer was formed was laminated to a glass substrate with a pressure sensitive adhesive having a thickness of about 20 μm (SK-2057, manufactured by Soken Chemical & Engineering Co., Ltd.) to prepare a sample. The sample was left to stand for 2 days under the conditions of 25° C. and a relative humidity of 60% and then the surface of the resin layer in the polarizing plate was subjected to a crosscut peeling test based on JIS K 5400. The sample was evaluated with the number of peeled portions based on the following criteria. However, the peeling operation using a tape was continuously carried out on the same sample twice and the total number of peeled portions of the two operations (the number of peeled portions after the completion of the second operation) was evaluated. Two continuous peeling operations means that the tape is laminated and peeled off and then further laminated and peeled off from the same sample.

A: Among 100 lattice cells, the number of peeled lattice cells was 0 (allowable).

B: Among 100 lattice cells, the number of peeled lattice cells was 1 to 10 (allowable).

C: Among 100 lattice cells, the number of peeled lattice cells was 11 or more (not allowable).

<Adhesiveness>

(Preparation of Pressure Sensitive Adhesive Layer)

The following pressure sensitive adhesive (A) was applied onto a PET film (peeling film) of 100 μm to form a pressure sensitive adhesive layer (A) (thickness: 10 μm). The pressure sensitive adhesive layer side of the PET with the adhesive (A) was roll-pressed against to the resin layer side of each of the obtained polarizing plates. When the PET with the pressure sensitive adhesive layer was pressed against the polarizing plate, a 2 kg roller reciprocated once. Then, the laminate thereof was left to stay at 25° C. for 12 hours. The prepared sample was cut into a width of 25 mm and a length of 160 mm.

(Pressure Sensitive Adhesive (A))

For the pressure sensitive adhesive (A), a pressure sensitive adhesive solution obtained by adding 0.04 parts by mass of an isocyanate-based curing agent (TD-75, manufactured by Soken Chemical & Engineering Co., Ltd.), and 0.06 parts by mass of a silane coupling agent (A-50, manufactured by Soken Chemical & Engineering Co., Ltd.) with respect to 100 parts by mass of an acrylic adhesive (SK-2147, manufactured by Soken Chemical & Engineering Co., Ltd.) was used.

(Measurement of Adhesiveness)

The protective film side of the obtained polarizing plate with the pressure sensitive adhesive (A) was laminated on the surface of glass (1737, manufactured by Corning Inc), which had been washed with water and dried, with a pressure sensitive adhesive acrylic adhesive (SK-1478, manufactured by Soken Chemical & Engineering Co., Ltd.). Next, only the PET layer of the polarizing plate with the pressure sensitive adhesive layer (A) was peeled off using a tensile tester under the conditions of at 25° C. and a peeling rate of 300 mm/min and 180° peeling based on JIS Z 0237. The adhesiveness between the pressure sensitive adhesive layer (A) and the resin layer of the polarizing plate was measured.

<Pressure Sensitive Adhesive Residue in Peeling Property in Reworking Process Evaluation>

A commercially available IPS liquid crystal panel was used and the glass surface was washed with acetone.

The pressure sensitive adhesive (A) was applied to a PET film (peeling film) of 38 μm to form a pressure sensitive adhesive layer (A) (thickness: 20 μm). The pressure sensitive adhesive layer side of the PET with the pressure sensitive adhesive (A) was roll-pressed against the resin layer side of each of the obtained polarizing plates. The laminate thereof was left to stay at 25° C. for 5 days and then cut into a size of 9.7 inches with an aspect ratio of 4:3.

Next, a PET film (peeling film) was removed from the laminate after the cutting and the polarizing plate was laminated on the washed glass surface with the pressure sensitive adhesive layer (A). The laminate was treated with an autoclave at 50° C. and 5 atmospheres for 30 minutes and then left to stay in an environment of 25° C. for 24 hours. Thereafter, the polarizing plate was peeled off again. The appearance of the glass surface from which the polarizing plate was peeled off was visually observed.

A: No pressure sensitive adhesive remained (allowable).

B: The pressure sensitive adhesive residue was less than 5 $mm^2$ (allowable).

C: The pressure sensitive adhesive residue was 5 $mm^2$ or more and less than 20 $mm^2$ (allowable).

D: The pressure sensitive adhesive residue was 20 $mm^2$ or more and not allowable.

TABLE 1

| Table 1 | Polyfunctional monomer A-TMMT | Boronic acid monomer Compound 1 | Polymerization initiator Irg 127 | Surfactant | | | Other monomers Compound 5 | Cured layer | | | |
|---|---|---|---|---|---|---|---|---|---|---|---|
| | | | | Compound 2 | Compound 3 | Compound 4 | | Irradiation dose (mJ) | Film thickness (μm) | Re (550) (nm) | Rth (550) (nm) |
| Curable resin composition 1 | 100 | 0.5 | 3.0 | — | — | — | — | 390 | 2.0 | 0.1 | 1.6 |
| Curable resin composition 2 | 100 | 0.5 | 3.0 | 0.2 | — | — | — | 390 | 2.0 | 0.1 | 1.7 |
| Curable resin composition 3 | 100 | 0.5 | 3.0 | — | 0.2 | — | — | 390 | 2.0 | 0.1 | 1.5 |
| Curable resin composition 4 | 100 | 0.5 | 3.0 | — | — | 0.2 | — | 390 | 2.0 | 0.1 | 1.6 |
| Curable resin composition 5 | 100 | — | 3.0 | 0.2 | — | — | 2.5 | 390 | 2.0 | 0.1 | 1.6 |
| Curable resin composition 6 | 100 | — | 3.0 | — | — | 0.2 | 2.5 | 390 | 2.0 | 0.1 | 1.6 |

TABLE 2

| Table 2 | Compound 2 | Compound 3 | Compound 4 |
|---|---|---|---|
| Structure: acrylate with -O-CH₂CH₂-(CF₂)₆F | | | 32.5 |
| Structure: acrylate with -O-CH₂CH₂-(CF₂)₆H | 90 | | |
| Structure: acrylate with -O-CH₂-(CF₂)₆H | | 90 | |
| Structure: acrylate with -O-(CH(CH₃)CH₂O)₆H | | 10 | 67.5 |
| Structure: acrylic acid (-C(=O)OH) | | | 10 |
| Weight average molecular weight (Mw) | 13,000 | 16,000 | 16,000 |

TABLE 3

| Table 3 | | Constitution of polarizing plate | | | | Evaluation | | | | |
|---|---|---|---|---|---|---|---|---|---|---|
| | Type of curable resin composition | Polarizer protective film | Thickness of polarizer (μm) | Resin layer | Thickness of polarizing plate (μm) | Contact angle with water (°) | Hydrogen bonding component of surface free energy (mN/m) | Adhesiveness | Adhesiveness (N/25 mm) | Peeling property in reworking process evaluation (Pressure sensitive Adhesive residue) |
| Comparative Example 1 | 4 | Film 1 | 20 | Cured layer 4 | 67 | 95.8 | 2.0 | A | 3.7 | D |
| 2 | 4 | Film 1 | 5 | Cured layer 4 | 52 | 96.2 | 2.1 | A | 3.9 | D |
| 3 | 6 | Film 1 | 5 | Cured layer 6 | 52 | 96.3 | 2.1 | B | 3.9 | D |
| 4 | 4 | Film 2 | 5 | Cured layer 4 | 36 | 96.1 | 2.0 | A | 3.9 | D |
| Example 1 | 1 | Film 1 | 20 | Cured layer 1 | 67 | 60.1 | 12.4 | A | 11.1 | A |
| 2 | 2 | Film 1 | 20 | Cured layer 2 | 67 | 90.3 | 4.3 | A | 7.6 | B |
| 3 | 3 | Film 1 | 20 | Cured layer 3 | 67 | 87.8 | 5.2 | A | 12.2 | A |
| 4 | 2 | Film 1 | 5 | Cured layer 2 | 52 | 90.1 | 4.2 | A | 7.5 | B |
| 5 | 3 | Film 1 | 5 | Cured layer 3 | 52 | 87.1 | 5.5 | A | 12.6 | A |
| 6 | 5 | Film 1 | 5 | Cured layer 5 | 52 | 91.1 | 3.7 | B | 6.3 | C |
| 7 | 3 | Film 2 | 20 | Cured layer 3 | 51 | 87.6 | 5.3 | A | 12.5 | A |
| 8 | 3 | Film 2 | 5 | Cured layer 3 | 36 | 87.0 | 5.6 | A | 12.6 | A |

From the result shown in Table 3, it was found that in the case of using a polarizing plate in which the hydrogen bonding component of surface free energy of the resin layer was less than 3.5 mN/m, the adhesiveness between the cured layer and the pressure sensitive adhesive layer was not sufficient and the peeling property in reworking process was deteriorated (Comparative Examples 1 to 4).

In contrast, it was found that in the case of using a polarizing plate in which the hydrogen bonding component of surface free energy of the resin layer was 3.5 mN/m or more, the adhesiveness between the cured layer and the pressure sensitive adhesive layer was satisfactory and the peeling property in reworking process was excellent (Examples 1 to 8).

Particularly, comparing Examples 1 to 5, 7, and 8 with Example 6, it was found that if the resin layer was a layer obtained by polymerizing and curing a boronic acid monomer having the boronic acid group represented by the above Formula (1) and a polymerizable group and a polyfunctional monomer, the adhesiveness with the polarizer was increased and the peeling property in reworking process was satisfactory.

Example 9

A polarizing plate having a total thickness of 69 μm was prepared in the same manners as in Examples 1 except that instead of using the curable resin composition 1, the following curable resin composition 7 having the same composition as that of the hard coat layer forming coating solution was used and a cured layer (resin layer) having a film thickness of 4 μm was formed in the same forming method as the forming method of the hard coat layer.

The hydrogen bonding component of surface free energy of the resin layer in the prepared polarizing plate was 12.0 mN/m.

In addition, Re(550) of the resin layer in the prepared polarizing plate was 0.1 nm and Rth(550) was 10.9 nm.

(Curable Resin Composition 7)

| | |
|---|---|
| KAYARAD DPHA [manufactured by Nippon Kayaku Co., Ltd.] | 48.5 parts by mass |
| KAYARAD PET30 [manufactured by Nippon Kayaku Co., Ltd.] | 48.5 parts by mass |
| IRGACURE 127: polymerization initiator [manufactured by BASF] | 3.0 parts by mass |
| Toluene | 97.0 parts by mass |
| Cyclohexanone | 3.0 parts by mass |

When trial products were formed by using each of the polarizing plate prepared in Examples 1 and 9, it was confirmed that an image display device having the polarizing plate prepared in Example 9 was tinted with yellow when the device was visually confirmed in the inclined direction.

In contrast, it was found that an image display device using the polarizing plate prepared in Example 1, that is, a polarizing plate having a resin layer in which Re(550) was 10 nm or less and the absolute value of Rth(550) was 10 nm or less was prevented from being tinted with yellow when the device was visually confirmed in the inclined direction.

EXPLANATION OF REFERENCES

100: Polarizing plate
12: Polarizer
14: Resin layer
16: Polarizer protective film

What is claimed is:
1. A polarizing plate comprising:
a polarizer; and
a resin layer that is in direct contact with the polarizer, wherein the thickness of the polarizer is 20 μm or less, a hydrogen bonding component of a surface free energy of the resin layer is 3.5 mN/m or more, the thickness of the polarizing plate is 70 μm or less, and wherein the resin layer is a layer obtained by polymerizing and curing a boronic acid monomer having a boronic acid group represented by the following Formula (1) and a polymerizable group, and a polyfunctional monomer having plural polymerizable ethylenically unsaturated groups:

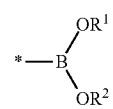

Formula (1)

wherein, in Formula (1), $R^1$ and $R^2$ each independently represent a hydrogen atom, or a substituted or unsubstituted aliphatic hydrocarbon group, aryl group or heterocyclic group, $R^1$ and $R^2$ may be linked to each other to form a ring, and * indicates a bonding position.

2. The polarizing plate according to claim 1, further comprising:
a pressure sensitive adhesive layer on the resin layer.
3. The polarizing plate according to claim 2, wherein the pressure sensitive adhesive layer includes an acrylic adhesive including an acrylic polymer.
4. The polarizing plate according to claim 2, wherein the pressure sensitive adhesive layer includes a component having an isocyanate group.
5. The polarizing plate according to claim 1, wherein Re(550) and Rth(550) of the resin layer satisfy the following expressions (X) and (Y), respectively:

$Re(550) \leq 10$ nm     Expression (X)

$|Rth(550)| \leq 110$ nm;     Expression (Y)

wherein Re(550) represents an in-plane retardation (nm) at a wavelength of 550 nm and Rth(550) represents a retardation (nm) in a thickness direction at a wavelength of 550 nm.
6. The polarizing plate according to claim 1, wherein the resin layer is a layer obtained by polymerizing and curing a polyfunctional monomer, and a polymerizable group included in the polyfunctional monomer is a (meth)acryloyl group.
7. An image display device comprising:
the polarizing plate according to claim 1.
8. The image display device according to claim 7 that is a liquid crystal display device.
9. The polarizing plate according to claim 3, wherein the pressure sensitive adhesive layer includes a component having an isocyanate group.
10. The polarizing plate according to claim 3, wherein Re(550) and Rth(550) of the resin layer satisfy the following expressions (X) and (Y), respectively:

$Re(550) \leq 10$ nm     Expression (X)

$|Rth(550)| \leq 110$ nm;     Expression (Y)

wherein Re(550) represents an in-plane retardation (nm) at a wavelength of 550 nm and Rth(550) represents a retardation (nm) in a thickness direction at a wavelength of 550 nm.

11. The polarizing plate according to claim 4,
wherein Re(550) and Rth(550) of the resin layer satisfy the following expressions (X) and (Y), respectively:

$$Re(550) \leq 10 \text{ nm} \quad \text{Expression (X)}$$

$$|Rth(550)| \leq 110 \text{ nm}; \quad \text{Expression (Y)}$$

wherein Re(550) represents an in-plane retardation (nm) at a wavelength of 550 nm and Rth(550) represents a retardation (nm) in a thickness direction at a wavelength of 550 nm.

12. The polarizing plate according to claim 3,
wherein the resin layer is a layer obtained by polymerizing and curing a polyfunctional monomer, and a polymerizable group included in the polyfunctional monomer is a (meth)acryloyl group.

13. The polarizing plate according to claim 4,
wherein the resin layer is a layer obtained by polymerizing and curing a polyfunctional monomer, and a polymerizable group included in the polyfunctional monomer is a (meth)acryloyl group.

14. An image display device comprising:
the polarizing plate according to claim 3.

15. An image display device comprising:
the polarizing plate according to claim 4.

16. The image display device according to claim 14 that is a liquid crystal display device.

17. The image display device according to claim 15 that is a liquid crystal display device.

* * * * *